June 4, 1935.                 J. MERCIER                  2,003,511
        COMPENSATING DEVICE ACTING BETWEEN THE DIFFERENT
             PNEUMATIC MOUNTINGS OF A VEHICLE
                   Filed Nov. 23, 1933

Jean Mercier
INVENTOR his ATTY.

Patented June 4, 1935

2,003,511

UNITED STATES PATENT OFFICE 2,003,511

COMPENSATING DEVICE ACTING BETWEEN THE DIFFERENT PNEUMATIC MOUNTINGS OF A VEHICLE

Jean Mercier, Neuilly-sur-Seine, France

Application November 23, 1933, Serial No. 699,475

3 Claims. (Cl. 267—65)

Pneumatic mountings for motor or other vehicles are already known, such for instance as comprise either a piston movable in a cylinder, or a pneumatic chamber, in which communication is made between the mountings of two or more wheels in order to more properly distribute the reactions of such mountings, either from one side of the vehicle to the other, or from front to rear. In such mountings, the pressures always tend to be equalized, owing to the communications between the mountings.

However, it is a known fact that the axles or the wheels are always differently loaded, and that such differences of load also vary with the net load which is carried, and thus, the pressures being the same in the different elastic mountings, it is quite difficult to compensate, by variable carrying surfaces, the difference between the loads supported by the various wheels.

The present invention has for its object to obtain a compensating device acting between the various elastic mountings of the wheels of a vehicle, which enables the use, in such mountings, of different pressures corresponding to the different loads to be supported. For this purpose, there is mounted in the communicating conduit which connects two pneumatic mountings, a non-leaking movable partition, such as a piston or a diaphragm, which is maintained in the mean position by a reaction spring of sufficient force to counterbalance the differences of static pressure which are adopted for the pneumatic mountings, and of sufficient flexibility to allow the variations of pressure due to the irregularities of the road to be transmitted from one pneumatic mounting to the other.

Figure 1:
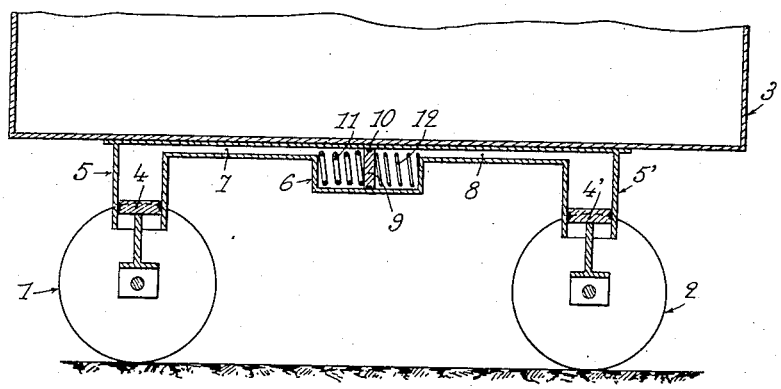
Figure 2:
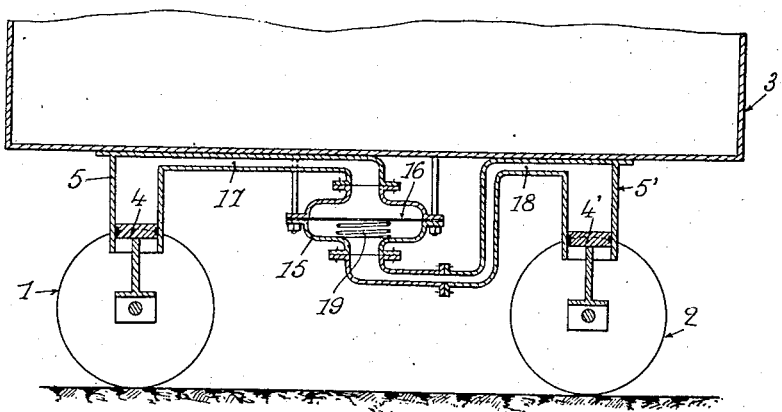

Figs. 1 and 2 of the accompanying drawing each represent by way of example a particular embodiment of the invention, in longitudinal section.

Between each of the wheels 1 and 2 and the frame 3 of a vehicle is interposed a pneumatic mounting consisting for example of a piston 4 or 4' and a cylinder 5 or 5'. A casing 6, which may be secured to the frame 3, communicates by means of respective conduits 7 and 8 with cylinders 5 and 5'. In the casing 6 is movable a piston 9 which is provided with packing 10 and whose respective sides are in contact with two springs 11 and 12. These springs have different strengths, in such way that the difference between the forces which they exert upon the piston 9 shall be equal to the difference between the static pressures in the cylinders 5 and 5' due to the different loads upon the wheels 1 and 2.

If it is supposed that the load on the wheel 1 is less than the load on the wheel 2, the static pressure in the chamber 5 is less than in the chamber 5'; in this case, the spring 11 is stronger than the spring 12. If the wheel 1 should come near the frame 3, due to an elevation on the road, the pressure which increases in the cylinder 5 will drive the piston 9 to the right, thus compressing the fluid or the air in the cylinder 5' in such way as to act against any movement of the wheel 2 and the frame 3 towards one another. Inversely, if a road depression should separate the wheel 1 from the frame 3, the reduction of the static pressure in the chamber 5 will reduce the pressure on the left side of the piston 9 with a consequent change in the balanced effect, which results in the piston 9 moving to the left under the action of the spring 12 and static pressure in the chamber 5' to equalize the loadings on the wheels 1 and 2.

In the modification shown in Fig. 2, a casing 15 is divided by a diaphragm 16 into two chambers which communicate by respective conduits 17 and 18 with cylinders 5 and 5'. A spring 19 which bears upon one face of the diaphragm 16, serves to counterbalance the part of the pressure in the cylinder 5 which exceeds the pressure in the cylinder 5'. The operation is the same as in the device shown in Fig. 1.

The above described compensating devices are adapted for use as well for vehicles supported on a wheeled gear as for vehicles provided with a supporting gear adapted to slide on land or on water, that is for all the vehicles in which the body for the passenger is carried by a supporting gear by the intermediary of pneumatic suspension devices.

Obviously, the aforesaid constructions are susceptible of various modifications without departing from the principle of the invention.

Having now described my invention what I claim as new and desire to secure by Letters Patent is:

1. In a vehicle provided with a body and a supporting gear, at least two chambers of variable volume adapted to contain a fluid under pressure and located at two distant points of said body between the supporting gear and the vehicle body, said chambers being subjected to different static pressures, means affording communication between said two chambers of variable volume, a partition which is movable in said means of communication and is in non-leaking contact with the walls of said means of communication, and elastic means adapted to balance the difference in the static pressures of said two chambers and to urge said movable partition towards the chamber in which the static pressure is the higher.

2. In a vehicle provided with a body and a supporting gear, at least two chambers of variable volume adapted to contain a fluid under pressure and located at two distant points of said body between the supporting gear and the vehicle body, said chambers being subjected to different static pressures, a casing mounted on the vehicle, a piston which is movable in said casing and is in non-leaking contact with the walls of said casing and divides said casing into two spaces, means of communication between said spaces and two of the said chambers of variable volume, and elastic means adapted to balance the difference in the static pressures of said two chambers and to urge said movable partition towards the chamber in which the static pressure is the higher.

3. In a vehicle provided with a body and a supporting gear, at least two chambers of variable volume adapted to contain a fluid under pressure and located at two distant points of said body between the supporting gear and the vehicle body, said chambers being subjected to different static pressures, a casing mounted on the vehicle, a flexible diaphragm dividing said casing into two spaces, means of communication between said spaces and two of the said chambers of variable volume, and elastic means adapted to balance the difference in the static pressures of said two chambers and to urge said diaphragm towards the chamber in which the static pressure is the higher.

JEAN MERCIER.